Figure 1:
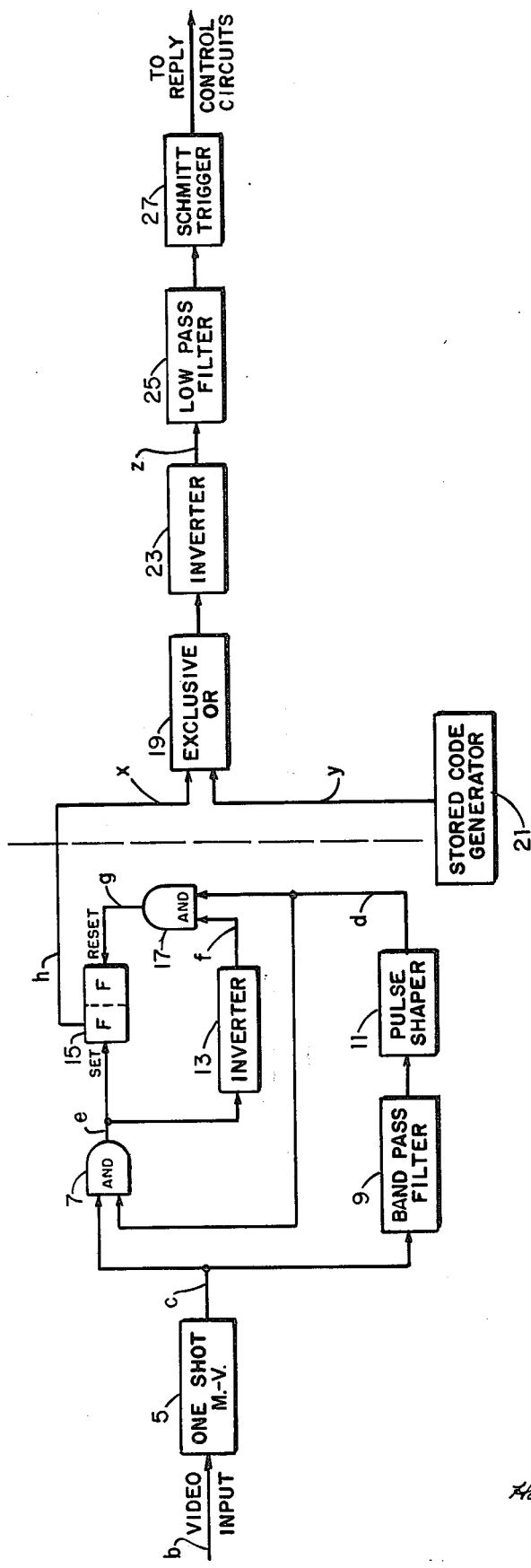

United States Patent [19]

Sullivan, Jr.

[11] 4,074,263
[45] Feb. 14, 1978

[54] CODE SIGNAL PROCESSING CIRCUITRY FOR IFF TRANSPONDER BEACON

[75] Inventor: Albert M. Sullivan, Jr., Ellicott City, Md.

[73] Assignee: The United States of America as represented by the Secretary of the Army, Washington, D.C.

[21] Appl. No.: 795,774

[22] Filed: Jan. 27, 1969

[51] Int. Cl.² .................................................. G01S 9/56
[52] U.S. Cl. .................................................. 343/6.8 LC
[58] Field of Search ............... 343/5 DP, 6.8, 6.8 LC, 343/6.8 R; 324/77 G

[56] References Cited

U.S. PATENT DOCUMENTS

| | | | |
|---|---|---|---|
| 3,047,806 | 7/1962 | Heslop | 343/5 DP |
| 3,341,845 | 9/1967 | Deman | 343/6.8 LC X |
| 3,447,155 | 5/1969 | Webb | 343/5 DP |

Primary Examiner—Malcolm F. Hubler
Attorney, Agent, or Firm—Nathan Edelberg; Jeremiah G. Murray; Sheldon Kanars

[57] ABSTRACT

The circuit includes means for regenerating and removing noise from a received pseudo-random IFF interrogation signal modulated onto a radar signal. The regenerated code is decoded by correlating it with a locally generated replica thereof which is run at a different bit rate, thus achieving asynchronous correlation.

4 Claims, 3 Drawing Figures

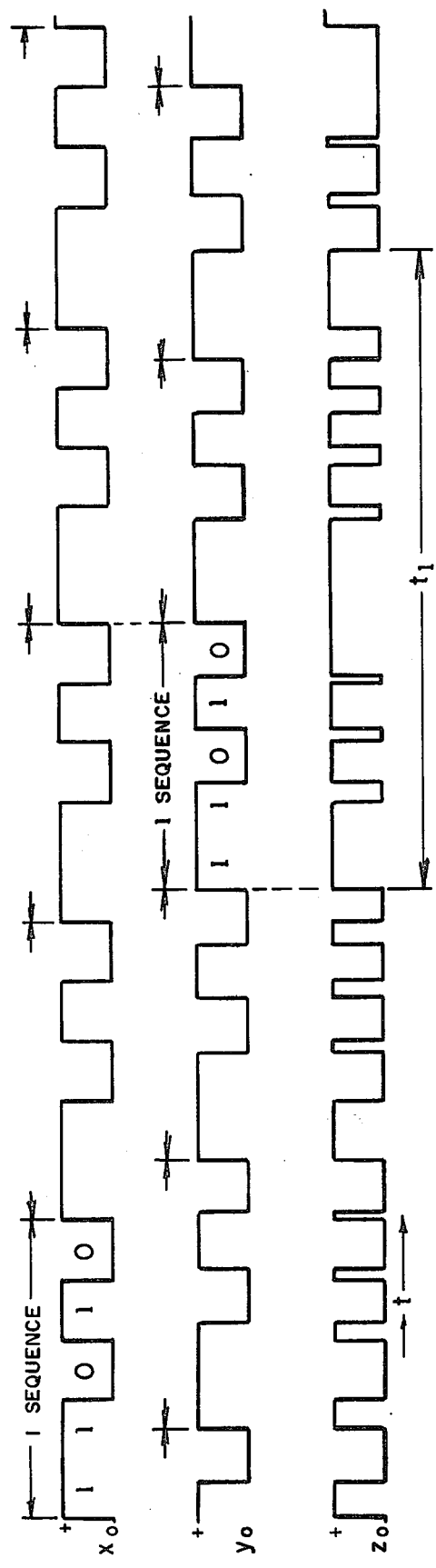

CODE SIGNAL PROCESSING CIRCUITRY FOR IFF TRANSPONDER BEACON

This invention relates to novel circuitry which may comprise part of an IFF (identification friend or foe) transponder beacon. Such beacons are usually carried by remote mobile vehicles or aircraft and are adapted to automatically reply to a coded interrogation signal sent from a central friendly station. The receipt of the reply at the central interrogating station verifies the fact that the remote station is a friendly one. The coding of the interrogation signal makes the system less susceptible to jamming and deception by hostile forces. The code may be changed periodically to further confuse the enemy. The decoding circuit at the transponder produces an output only if the received coded signal matches the code stored at the transponder and the output thereof actuates the reply circuitry. Psuedor-andom codes (PRC) have been used in the past because their randomness makes it difficult for an enemy to decipher and reproduce them. Such codes may be a long series of binary numbers which change in a random fashion within each cycle or sequence thereof, but each sequence is a replica of the preceding one. Hence the code is not truly random, and thus is called pseudo random. The present invention comprises transponder beacon circuitry for processing such codes to remove atmospheric or jamming components from the received coded interrogation signal and decoding circuitry for comparing the received code with a locally stored replica thereof by a correlation process. The circuitry is intended for use in an IFF system in which the interrogation signal is modulated onto a radar signal by either delaying or not delaying each radar pulse in accordance with the binary number forming the PRC. The known periodicy of the radar pulses is utilized at the transponder to both eliminate spurious received pulses and also to extract the pseudo-random code from the received radar video signal with the use of appropriate logic circuitry. The decoding circuit correlates the regenerated received code with the stored replica thereof in an asynchronous manner, thus eliminating the need for complex synchronizing circuitry.

It is thus an object of the invention to provide an improved IFF transponder beacon.

Another object is to provide novel and improved circuitry for processing received pseudo-random codes.

A further object is to provide novel circuitry for extracting and regenerating a code which is modulated onto a stream of radar pulses and for decoding said code.

Another object of the invention is to provide a novel and useful means for correlating a pair of codes without synchronizing circuitry.

Figure 2:
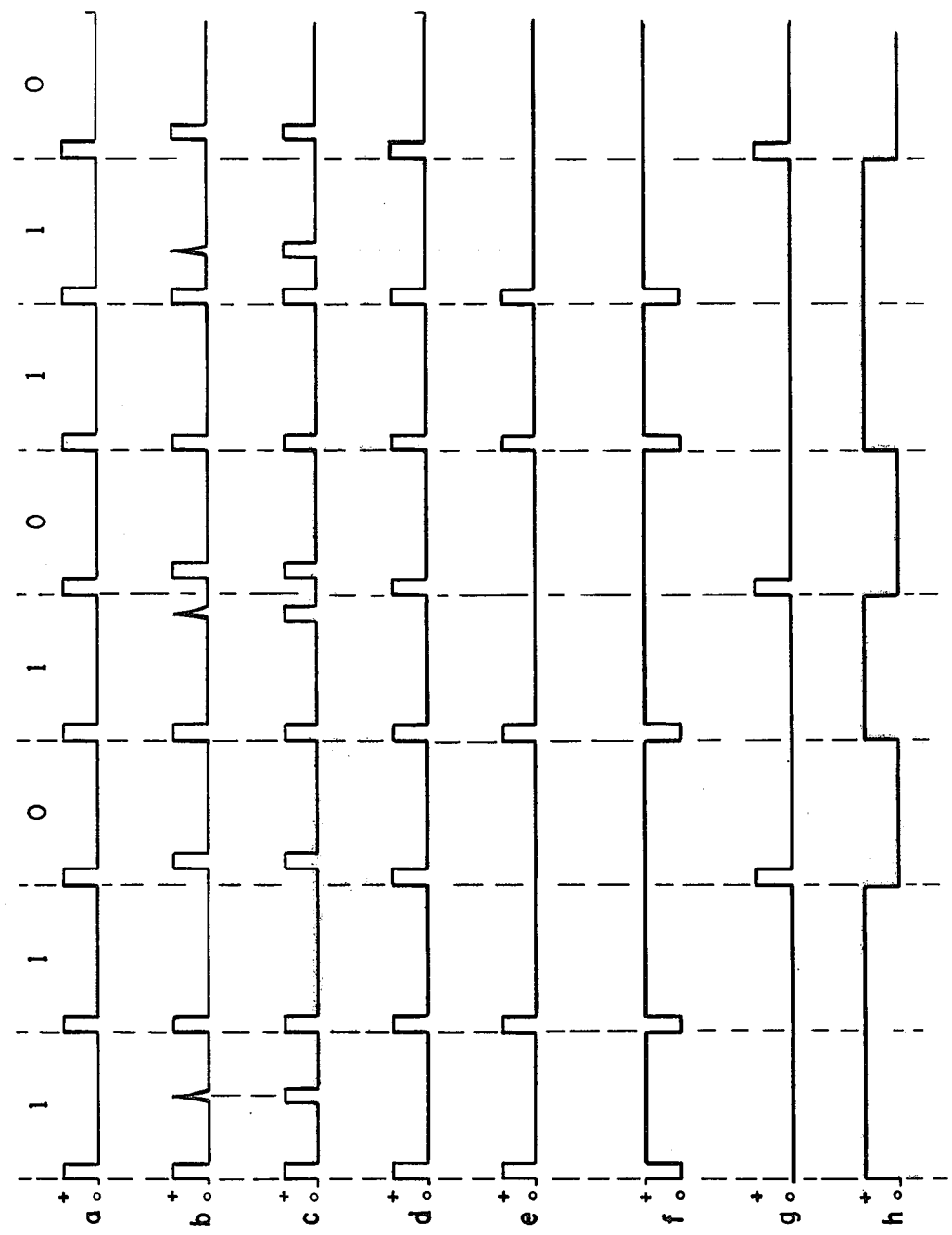

These and other objects and advantages of the invention will become apparent from the following detailed description and drawings, in which:

FIG. 1 is a block diagram of a preferred embodiment of the present invention and FIGS. 2 and 3 are waveforms at various parts of the circuit of FIG. 1.

The circuitry of FIG. 1 may comprise a portion of a transponder beacon. The input of the circuit comprises a train, $b$, of radar video pulses which are obtained from a radar receiver, not shown. The circuitry to the left of the vertical dashed line comprises the means for extracting the code impressed on the video pulse train and for regenerating this code by removing spurious pulses therefrom. The pseudo-random code is then applied to the decoding circuitry to the right of the dashed line.

The circuitry includes a one-shot (or monostable) multivibrator 5 to which the input radar video pulse train is applied. The letters on the various leads correspond to the similarly lettered waveforms of FIGS. 2 and 3. FIG. 2a represents the unmodulated radar signal emitted by the friendly interrogating radar set. FIG. 2b represents the input, $b$, of multivibrator 5. This input comprises video pulses which have been position or time modulated in accordance with a pseudo-random code. In the illustrative example, a binary 1 is indicated if the radar pulse is undelayed and a binary 0 is indicated by a delayed radar pulse. The code of FIG. 2 comprises the sequence 11010 and one complete cycle or sequence thereof is shown plus a portion of a second sequence. It can be seen that the third, fifth and eighth radar pulses of FIG. 2b are delayed relative to the corresponding unmodulated pulses of FIG. 1a, to indicate the binary 0's of the received code. Also included in FIG. 2b are three noise or jamming spikes which form part of the input to multivibrator 5. The multivibrator provides a pulse train at its output of constant amplitude and width comprising both the coded radar pulses and the noise spikes, as shown in FIG. 2c. The output, $c$, of the multivibrator 5 is applied to one input of AND gate 7 and to band pass filter 9, the output of which is applied to pulse shaper 11. The filter 9 and pulse shaper 11 together comprise a means for extracting the unmodulated radar pulse train from the coded and noisy input pulse train of FIG. 2c. The resonant filter 9 is tuned to the unmodulated pulse repetition frequency (PRF) of the radar set. The waveform of FIG. 2c, even though it appears irregular, will have a strong component at the radar PRF and the filter 9 is shock excited by its input and will oscillate at the radar PRF, to which it is tuned. The pulse shaper 11 converts the sinusoidal output of the filter 9 to a train of pulses of the same frequency, as shown in FIG. 2d. The output of pulse shaper 11 forms one of the inputs of each of the AND gates 7 and 17. The output of AND gate 7 (lead $e$) is applied to the set input of flip-flop 15 and to inverter 13, the output of which forms the second input (lead $f$) of AND gate 17. As can be seen from FIG. 2c and $d$, whenever the multivibrator and pulse shaper have simultaneous outputs, the AND gate 7 will have an output, $e$. It can be seen that the pulses of FIG. 2e indicate the beginning of all time slots containing a binary 1. Each of these pulses of FIG. 2e sets the flip-flop 15 if it was previously reset but does not affect it if already in the set condition. The output of the inverter 13 of FIG. 2f is merely the complement or inversion of that of FIG. 2e. The AND gate 17 will have an output, $g$, only if its two inputs are positive simultaneously. This occurs at the beginning of each time slot in which the code value is binary 0. At such times the output of gate 7 is low (or zero) because of the delayed received radar pulse and hence the output of inverter 13 is high (or positive). The coincidence of this inverter output and the output $d$ of the pulse shaper produces the pulse train of FIG. 2g at the output of the gate 17. Each of these pulses are arranged to reset the flip-flop 15 if in the set condition. Thus the presence of a delayed radar video pulse produces a zero or reset output from the flip-flop and an undelayed video pulse results in a one or set output therefrom. Thus the output, $h$, of the flip-flop reproduces the code in conventional two-level form. Since none of the noise pulses of FIG. 2c coincide with any of the pulses of FIG. 2d, none of the noise pulses will trigger the flip-flop 15.

The pseudo-random code output of the flip-flop 15 forms one input of Exclusive-OR gate 19, the other input of which is the output of stored code generator 21. The output of gate 19 is applied to the inverter 23, the low pass filter (or integrator) 25 and the Schmitt trigger 27, all connected in cascade in the order named. The Exclusive-OR gate 19, sometimes referred to as a modulo 2 adder, has the property that it produces an output (or positive voltage) if one or the other of its inputs is positive and no output (zero voltage) if both inputs are positive or both inputs zero. Thus an output or positive voltage is produced only if its inputs differ. The inverter 23 therefore will produce positive voltage at its output (lead $z$), only if the inputs to gate 19 are the same, that is either both binary 1 or both binary 0. The waveforms in this section of the circuit are shown in FIG. 3. FIG. 3x comprises the input of gate 19 which is obtained from the flip-flop 15 and is thus the same as the waveform of FIG. 2h, but contains five cycles or sequences of the code (11010). The generator 21 contains a stored replica of the received code, for example, this generator may comprise an endless loop of magnetic tape which contains one sequence of the code, which is continuously repeated by a tape player. While each sequence in the output, $y$, of the generator is the same sequence of binary numbers as in the received code, the clock or bit rate of the generator is made slightly different from that of the received code of FIG. 3x. In the illustrative example of FIG. 3, the length of each binary bit and hence also of each sequence of random numbers at the output of generator 21 is made 0.9 that of the received sequence of FIG. 3x. It should be noted that in practice these pseudo-random codes would comprise many more than the five-bit code illustrated, however the principle can be more easily explained with the use of the shorter code sequence. The received and stored codes are then asynchronous and hence will scan past each other at a rate equal to the difference in their repetition frequencies. The correlation or decoding circuitry comprising the gate 19 and the inverter 23 and filter 25 will produce a maximum output each time that the two code sequences comes into approximate phase coincidence. This is illustrated by the waveform of FIG. 3z, which is the output $z$ of the inverter 23. Near the left hand end of FIG. 3 the waveforms $x$ and $y$ are nearly opposite in phase and hence the pulses of waveform $z$ in this region has more zero portions than positive portions and hence a small dc or average value. As time progresses the two waveforms slip into phase and in the region $t_1$ are in-phase or nearly so and hence produce a correlation peak as evidenced by the fact that the waveform $z$ is mainly positive with a high average value. This high correlation results from the fact that in the region $t_1$, for a great majority of the time, the two waveforms of FIGS. 3x and $y$ are both of the same binary number and hence the inverter 23 will produce a positive voltage for the great majority of this time. The low pass filter 25 integrates these correlation peaks and when the voltage at the filter output reaches the triggering level of the Schmitt trigger 27, this circuit changes state to actuate the reply circuits, not shown. Of course, if the received and stored codes do not match no correlation occurs and the Schmitt trigger will not be actuated. As mentioned above, the fact that the correlation process is asynchronous greatly simplifies the circuitry.

While the invention has been described in connection with a single illustrative embodiment, many obvious variations thereof will be apparent to those skilled in the art.

What is claimed is:

1. Transponder beacon circuitry for processing received binary coded signals, comprising a received radar video pulse train which is time modulated in accordance with a binary code, means to extract the binary code from said pulse train in two-level form, said means including a resonant filter tuned to the pulse repetition frequency of said radar video pulse train and a pulse shaper in cascade therewith and wherein said resonant filter is shock excited by said received video pulse train, whereby said pulse shaper produces an unmodulated video pulse train, and means for correlating said extracted binary code with a locally stored code which is run at a different bit rate than said extracted binary code.

2. The circuitry of claim 1 wherein said last-named means comprises an Exclusive-OR gate and a stored code generator, the inputs of said gate being said extracted binary code and the output of said stored code generator, an inverter and a low pass filter connected in cascade to the output of said gate, and a threshold circuit comprising a Schmitt trigger connected to said low pass filter, said Schmitt trigger being arranged to actuate reply control circuits.

3. Decoding circuitry for an IFF transponder beacon, comprising, a received interrogating signal comprising a pseudo-random code, means to correlate said received signal in an asynchronous manner with a locally stored replica of said received signal by operating said locally stored replica at a different bit rate than said received signal, and wherein said means comprises an Exclusive - or gate, an inverter and a low pass filter all connected in cascade in the order named, and a stored code generator, the inputs of said gate being said received signal and the output of said stored code generator.

4. The circuitry of claim 3 further including a threshold device connected to the output of said low pass filter, said device being arranged to actuate a reply circuit when the threshold thereof is exceeded by the output of said low pass filter.

* * * * *